(12) United States Patent
Ehrler et al.

(10) Patent No.: US 8,504,592 B2
(45) Date of Patent: Aug. 6, 2013

(54) DATA ORGANIZATION TOOL AND APPARATUS FOR REMOTELY MANAGING A MEETING

(75) Inventors: Stefan Ehrler, Biblis (DE); Wolfgang Kuhn, Sinsheim (DE); Sibylle Borhauer, Mannheim (DE); Dagmar Becker, Ostringen (DE)

(73) Assignee: SAP AG, Walldorf (DE)

( * ) Notice: Subject to any disclaimer, the term of this patent is extended or adjusted under 35 U.S.C. 154(b) by 138 days.

(21) Appl. No.: 12/975,033

(22) Filed: Dec. 21, 2010

(65) Prior Publication Data

US 2012/0078976 A1   Mar. 29, 2012

Related U.S. Application Data

(60) Provisional application No. 61/385,908, filed on Sep. 23, 2010.

(51) Int. Cl.
*G06F 17/30* (2006.01)

(52) U.S. Cl.
CPC ..................... *G06F 17/30* (2013.01)
USPC ............ 707/805; 707/766; 707/769; 707/802

(58) Field of Classification Search
CPC ........................................................ G06F 17/30
USPC ................. 707/609–621, 655–661, 802–807, 707/600–607, 687, 694, 705–710, 765–766, 707/769, 792; 715/753, 758; 709/203, 215–220
See application file for complete search history.

(56) References Cited

U.S. PATENT DOCUMENTS

| | | | | |
|---|---|---|---|---|
| 5,831,664 | A * | 11/1998 | Wharton et al. | 725/81 |
| 5,960,406 | A * | 9/1999 | Rasansky et al. | 705/7.18 |
| 6,101,480 | A * | 8/2000 | Conmy et al. | 705/7.18 |
| 7,065,658 | B1 * | 6/2006 | Baraban et al. | 713/300 |
| 7,523,385 | B2 * | 4/2009 | Nguyen et al. | 715/200 |
| 8,336,029 | B1 * | 12/2012 | McFadden et al. | 717/124 |
| 8,364,429 | B2 * | 1/2013 | Houston et al. | 702/62 |
| 2003/0018506 | A1 * | 1/2003 | McLean et al. | 705/7 |
| 2004/0039755 | A1 * | 2/2004 | Kunze | 707/104.1 |
| 2004/0073567 | A1 * | 4/2004 | Pelon | 707/102 |
| 2005/0119922 | A1 * | 6/2005 | Eder | 705/7 |
| 2005/0203896 | A1 * | 9/2005 | Weild | 707/3 |
| 2006/0168259 | A1 * | 7/2006 | Spilotro et al. | 709/229 |
| 2006/0230063 | A1 * | 10/2006 | Pollinger | 707/103 Y |
| 2007/0083401 | A1 * | 4/2007 | Vogel et al. | 705/5 |
| 2007/0118571 | A1 * | 5/2007 | Tysowski et al. | 707/201 |
| 2007/0156779 | A1 * | 7/2007 | Ho et al. | 707/201 |
| 2007/0239660 | A1 * | 10/2007 | Tien et al. | 707/2 |
| 2007/0294279 | A1 * | 12/2007 | Jung et al. | 707/102 |
| 2008/0184140 | A1 * | 7/2008 | Koerner | 715/762 |
| 2009/0187814 | A1 * | 7/2009 | Raff | 715/205 |
| 2009/0228321 | A1 * | 9/2009 | Srinivasan et al. | 705/9 |
| 2011/0072392 | A1 * | 3/2011 | Shih | 715/811 |

* cited by examiner

FOREIGN PATENT DOCUMENTS

| | | | |
|---|---|---|---|
| EP | 2068278 | * | 6/2009 |
| WO | WO 2006/091370 | * | 8/2006 |
| WO | WO 2008/084059 | * | 7/2008 |

*Primary Examiner* — Srirama Channavajjala
(74) *Attorney, Agent, or Firm* — Kenyon & Kenyon LLP

(57) ABSTRACT

The system, method and computer readable medium that facilitates selection of a meeting participant, and the creation of a first data structure based on the selected meeting participant. Data may be collected in response to the selection of the meeting participant. A second data structure may be generated for the collected data, and the data in the second data structure may be linked to the first data structure and the selected meeting participant.

11 Claims, 3 Drawing Sheets

200

300

US 8,504,592 B2

DATA ORGANIZATION TOOL AND APPARATUS FOR REMOTELY MANAGING A MEETING

This application claims the benefit under 35 U.S.C. §119 of U.S. Provisional Application Ser. No. 61/385,908 filed on Sep. 23, 2010, the entire contents of which are incorporated herein by reference.

BACKGROUND

Disclosed is a tool and apparatus for managing the scheduling and content for discussion in a meeting. Specifically, a computer-implemented tool that collects data related to items input into a data structure that is organized for rapid navigation based on selected inputs by a user.

Meetings require planning and graphical information may be used during the meeting to guide the discussion. Preparation for the meeting may include preparing an agenda for the meeting and determining what information may be needed for the meeting. In conventional systems, graphical information, such as reports, biographical information, informational data and product descriptions are provided as hard copy documents, or alternatively, may be presented via an overhead projector or the like. Obtaining, generating and preparing (such as deciding which reports to include or delete, or create graphical data or documents, etc.) the graphical information may be time consuming and laborious. In addition, in situations where additional information may be required, a follow-up, or additional meeting, may be required.

The inventors recognized the need for a tool to facilitate efficient preparation for meetings and minimizing the meeting planner's dilemma of deciding which documents to include in the presentation.

DETAILED DESCRIPTION

Embodiments provide for a system that may include a processor, a data storage, a client terminal, a portable device and a communication manager. The processor may execute a plurality of computer applications, and be configured to operate on data records that are accessible by computer applications from the plurality of computer applications. The data storage may be accessed by the processor, and may maintain data records having information related to a variety of different business functions of an enterprise. The data records in the data storage may be modified by a client terminal. The portable device may generate an agenda data structure related to a specific person with whom a meeting is to be conducted and in communication with the processor. The communication manager facilitates communication between the portable device and the data storage.

Embodiments also provide for a method and computer readable medium for implementing the method. The method may include building, by a processor, a first data structure in response to a selection of a meeting participant. A query to data storage for data related to a selected meeting participant may be generated by the processor. In response to the query, a graphical user interface on a portable device may receive meeting participant-related files from a respective computer application. A second data structure may be generated in response to selection of a report from presented reports, wherein the report may be a customized report or a generic report. A query may be generated and sent to retrieve the selected reports from data storage. Retrieved data may be inserted in data fields of a first data structure in response to user inputs to the graphical user interface. The data inserted in a second data structure may be linked to data fields in the first data structure.

Additional embodiments may provide a meeting preparation application executing on a processor within a portable device. The processor may be configured to generate a data structure having a plurality of data fields. The data fields may be populated with links to data obtained from a data storage related to one of a plurality of computer applications. The processor may present a graphical user interface that provides a graphical representation of the data in the data fields, and receives commands to execute data retrieval and further presentation. Alternatively, or in combination with the portable device, a client terminal may execute the meeting preparation application.

Figure 1:
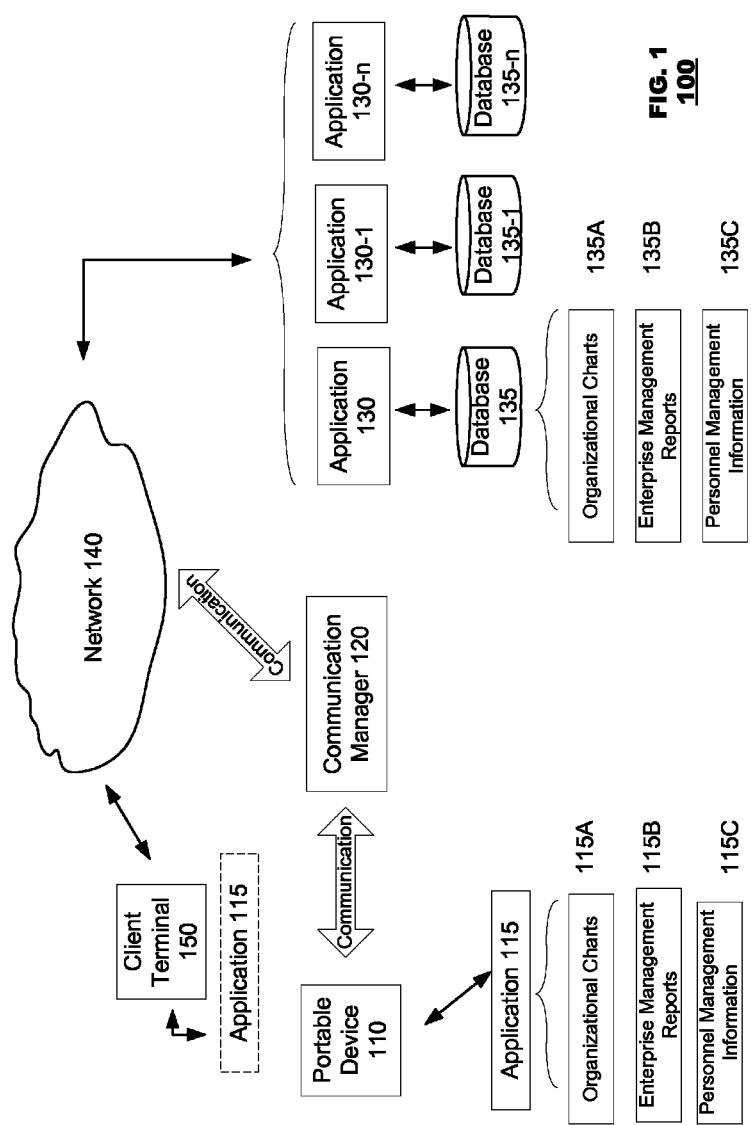
FIG. 1 illustrates a functional block diagram of an exemplary system according to an embodiment of the present invention.

FIG. 1 illustrates a functional diagram of an exemplary implementation according to an embodiment of the present invention. The exemplary implementation 100 includes a portable device 110, a communication manager 120, various applications 130, 130-1 through 130-$n$, a network 140 and client terminal 150.

Various applications 130-1 through 130-$n$ provide various functionality to network users. For example, the applications 130, 130-1 through 130-$n$ may provide spreadsheet functions (e.g., Excel ®, Access®), word processing functions (e.g., Word®, WordPerfect®), presentation functions (e.g., Adobe® Acrobat®, PowerPoint®), or proprietary functions (e.g., employee performance tracking, other human resources functions, and business functions, such as invoicing and accounting). (Adobe® and Acrobat® are registered trademarks of Adobe Systems Incorporated, WordPerfect® is a registered trademark of Corel Corporation, and Access®, Excel®, PowerPoint®, and Word® are registered trademarks of Microsoft Corporation.) Each application 130, 130-1 through 130-$n$ may execute independently of each other.

The applications 130, 130-1 through 130-$n$ may store information in data records related to the functions of the respective application. For example, databases 135, 135-1 through 135-$n$ may store in data records data generated by the respective applications 130, 130-1 through 130-$n$. For example, application 130 may be a human resources application that generates, or modifies, data that is stored in database 135. The generated (or modified) data stored in database 135 may be stored in data structures, such as organizational charts 135A, enterprise management reports 135B and/or personnel management information 135C. The applications 130, 130-1 through 130-$n$ may be accessible by a client terminal 150 via the network 140. The client terminals 150 may allow users to use the applications 130, 130-1, and 135-$n$ to perform respective tasks. The network 140 may be configured with a number of servers and other processing devices, and may have access to data storage devices for storing and retrieving data.

The portable device 110 may include wired and wireless communication capabilities, a memory and a processor that executes application 115 that builds a master meeting data structure. The portable device 110 may be any type of tablet computer, laptop computer, personal digital assistant (PDA), smartphone or the like. The master meeting data structure built by the application 115 may include information related to organizational charts 115A, enterprise management reports 115B, and personnel management information 115C. This information 115A-115C may correspond to data records stored in database 135, or any other database 135-1 to 135-n.

The application 115 may also be hosted on a server or client terminal as shown in phantom below client terminal 150. A user at the client terminal 150 may use the application 115 to build a master data structure for a meeting, and store the data structure on a data storage associated with the network 140 (e.g., databases 135 to 135-2) or at a data storage accessible by the portable device 110.

The communication manager 120 may execute on the servers associated with the network 140. The communication manager 120 may facilitate communication between the network 140 and the portable device 110. The communication manager 120, when executing on a processor, may allow files to be transferred from/to the portable device 110, via the network 140, to/from the databases 135, 135-1, 135-n associated with applications 130, 130-1, 130-n. Communication manager 120 may include additional functionality such as file compression to facilitate the transfer of data files, query conversion and data retrieval and delivery, and may be implemented, for example, using a Sybase-based implementation. Communications between the communication manager 120 and the portable device 110 may be either performed over wired or wireless communication paths.

Figure 2:
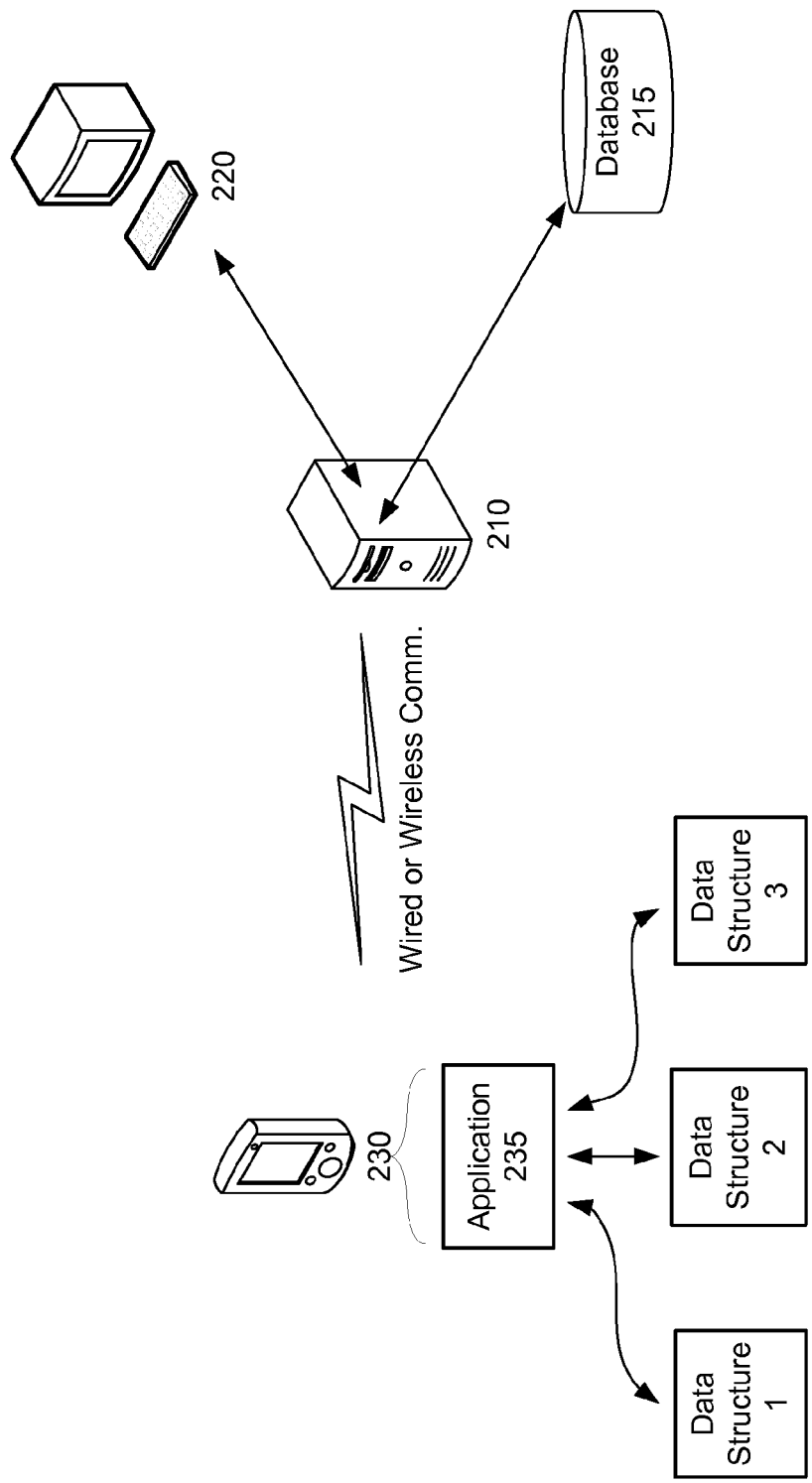
FIG. 2 illustrates an exemplary hardware configuration for implementing a system according to an embodiment of the present invention.

FIG. 2 illustrates an exemplary hardware configuration for implementing a system according to an embodiment of the present invention. The system 200 may comprise one or more networked servers 210, one or more client terminals 220, data storage devices 215, wired and wireless communication links, and a portable device(s) 230. The one or more networked servers 210 may execute a multi-application software system. The servers 210 may include processor(s), internal memory and related computer program instructions (not shown).

The server 210 may execute on a processor a communication manager program that facilitates communication including data transfers between the networked servers 210 and the portable devices 230 over wired or wireless communication paths. The communications manager within the server 210 may facilitate communication between the portable device 230 and the applications, for example, applications 130, 130-1, 130n of FIG. 1, executing on the server 210. The servers 210 may access data storage device(s) 215 that store computer-readable software instructions that may be accessed and executed by the processor(s) of the server 210, such as applications 130, 130-1 and 130-n shown in FIG. 1.

The data storage device(s) 215 also may store data generated by the applications, shown as databases 135, 135-1, and 135-n of FIG. 1. Data storage device 215 may be a hard disk drive, non-volatile memory, flash memory, or any suitable device for storing electronic data. Persistent data may be maintained in the data storage device 215 that is at the back-end of the computer system. The data storage may maintain data records having information related to a variety of different business functions of an enterprise. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained. Data synchronization of any data changed on the portable device 230 may be performed by the servers 210 on the data storage device 215 and, for example, the databases 135, 135-1, and 135-n of FIG. 1.

The servers 210 may communicate with client terminal(s) 220 and portable device(s) 230 via network connections. The client terminals 220 may include a processor and data storage device (not shown), such as a hard disk. The client terminals 220 may participate in execution of program instructions representing the applications 130, 130-1 and 130-n of the software system. The portable device 230 may be a tablet, notebook or mini-notebook computer capable of wired and/or wireless communication. The portable device 230 may include memory, a processor, and devices for wired or wireless communication. An application 235 executing on the portable device 230 may generate data structures 1, 2 and 3 using data replicated from data records stored on the data storage device 215 or that are input to the portable device 230 by a user. The application 235 may also be network based and accessible by the client terminals 220.

The number of servers, number of clients and topology of the network connections between them are immaterial to the present discussion unless otherwise noted. For example, in a human resources environment, department staffing including headcount, projected growth, and attrition, employee profiles and salary information, key positions and employee performance, and the like may be maintained. Or, in an accounting environment, invoicing, accounts due, accounts payable, projected revenue and the like may be maintained In an exemplary embodiment as shown in FIG. 2, the application 235 may communicate with the server 210. A communication manager (see FIG. 1 element 120) may facilitate the communication between the application 235 and the applications executing on the server 210 and retrieval of requested data based on queries sent by the application 235.

Figure 3:
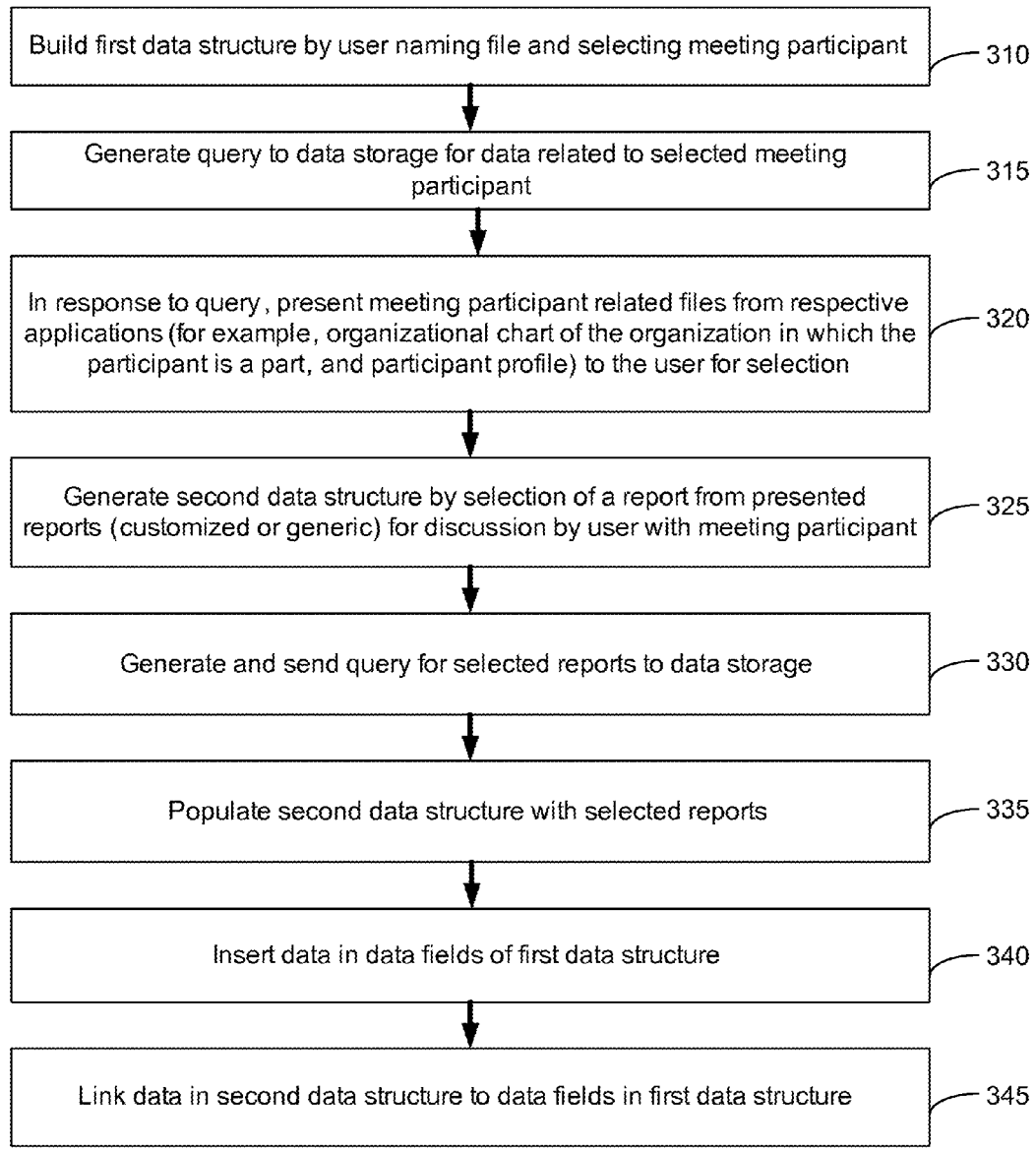
FIG. 3 illustrates an exemplary process for collecting information for managing a meeting according to an embodiment of the present invention.

A process 300 for applying the functions of the described system will be made with reference to FIG. 3 above. At step 310, a user may create via the application (e.g., application 235 in FIG. 2) a data structure and may select a manager with whom the user is to meet.

A query, at step 315, may be generated by the application 235 and forwarded to the communication manager for retrieval of data related to the selected meeting participant from the data storage. In response to the query, at step 320, the retrieved data may be presented to the user for selection. The requested data may include data files related to the selected meeting participant generated by respective computer applications (for example, applications that develop an organizational chart of the organization in which the participant is a part, and/or participant profile, or applications 130, 130-1, 130-n of FIG. 1).

At step 325, a second data structure may be generated by the user selection of a report from presented reports (customized or generic) for discussion by user with meeting participant. Customized reports may be reports generated by the user in preparation for the particular meeting. A generic report may be a standard business report related to the business unit that the selected participant is assigned. The generic reports may differ from one another. This information may for example be obtained from the organizational chart downloaded into the first data structure. A query may be generated, at step 330, and may be sent to data storage so the selected reports may be retrieved. For example, the application may identify reports and other documents associated with the selected meeting participant and present links to reports. Upon user selection of a particular link (i.e., database address), the application may generate a query for data stored at the link. At step 335, a second data structure may be populated with selected reports. In this step, the requested data may be delivered to the application 235, which may insert the delivered data into the second data structure. A user may insert data in data fields of the first data structure (Step 340). The additional data may indicate topics for discussion, in which case, steps 325-335 may be repeated to populate the data structure with data related to the discussion topic.

After a user has completed entering text in the data structure in a graphical user interface, the user may be presented with the option to update the second data structure by creating another record in the second data structure by adding an item or deleting a data record related to, for example, the employee profile of an employee referenced in the meeting. The second data structure may also be updated to incorporate the employee profiles. Upon referencing a specific employee, a related data record may be incorporated into the second data structure and a link to a file containing data related to the specific employee's profile information may also be incorporated into the second data structure. In addition, the second data structure may be updated with data objects retrieved from a data storage of the network. For example, the user may desire to add a data object (e.g., salary increases, training achievements, dependency changes, and the like) to the data records of the second data structure. The application may allow the user to select the type of object to be added, and may provide a search result menu of known objects. A number of enterprise generated reports may also be accessed via different selections to a user interface that may result in the generation of a query for the selected report. For example, a consolidated report of all of the managers may be presented to the user by selecting multiple related reports.

The data in the second data structure may, at step 345, be associated with respective data fields in the first data structure. Upon selection of the data field in the first data structure, links to the related data in the second data structure are presented to the user. For example, the generated first and second data structures may be stored on the remote device 230 or on a network accessible data storage device 215. The application 235 may present the data stored in the first and second data structures. Multiple data records from the second data structure may be presented simultaneously to a user. As a further example, two employee profiles stored as data records in the second data structure may be presented simultaneously on a display to allow for comparison of the employee profiles.

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

We claim:

1. A meeting presentation material management system, comprising:

a processor for executing a plurality of computer applications, the processor configured to operate on meeting presentation related data records accessible by at least one of the computer applications, and having information related to a variety of different enterprise business functions;

a data storage accessible by the processor for maintaining the data records;

a client terminal for modifying data records in the data storage;

a portable device in communication with the processor; and a communication manager for facilitating communication between the portable device and the data storage, wherein the processor is further configured to:

generate a first data structure related to a selected meeting participant and having a plurality of data fields, in response to a selection of the meeting participant;

generate a query to a computer application to access the data storage for data related to the selected meeting participant;

as a result of the query, receive and present meeting participant-related files from the computer application in a graphical user interface representation of the first data structure on the portable device, with the data fields populated with links to data obtained from the data storage;

receive commands to execute data retrieval and further presentation of data;

generate a second data structure having a plurality of data fields, in response to selection of a report from presented reports on the portable device, wherein the report is one of a customized report, a generic report, and a consolidated report;

generate and send another query to the data storage for retrieving the selected reports;

populate the second data structure data fields with links to data obtained from a data storage related to one of the computer applications;

present a graphical representation of the second data structure, with the second data structure populated with the selected reports;

receive commands to execute data retrieval and further presentation of data in the second data structure;

insert data in data fields of the first data structure in response to user inputs to the graphical user interface; and link data in the second data structure to data fields in the first data structure.

2. The system of claim 1, wherein the communication manager allows files to be compressed and transferred via the network between the portable device and databases associated with respective computer applications.

3. The system of claim 1, wherein the processor is located in the client terminal.

4. The system of claim 1, wherein the processor is located in the portable device.

5. The system of claim 1, wherein the report includes at least one of biographical information, informational data, a product description, a spreadsheet, a presentation, employee performance tracking data, an invoice, accounts due data, accounts receivable data, projected revenue data, key position data, an organizational chart, an enterprise management report, a headcount, a growth projection, and attrition data.

6. A computer-implemented method for managing meeting presentation material, comprising:
    building a first data structure related to a selected meeting participant and having a plurality of data fields, in response to a selection of a meeting participant;
    generating a query to a data storage for meeting presentation data related to a variety of different enterprise business functions and related to the selected meeting participant;
    in response to the query, populating the data fields with links to meeting presentation data, and receiving and presenting meeting participant-related files from a respective computer application in a graphical user interface representation of the first data structure on a portable device;
    receiving commands to execute data retrieval and further presentation of data;
    generating and presenting a graphical representation of a second data structure having a plurality of data fields populated with links to the files in response to selection of a report from presented reports, wherein the report is one of a customized report, a generic report, and a consolidated report;
    generating and sending another query to data storage to retrieve the selected reports;
    populating the second data structure with the selected reports;
    receiving commands to execute data retrieval and further presentation of data in the second data structure;
    inserting data in the data fields of the first data structure in response to user inputs to the graphical user interface; and
    linking data in the second data structure to the data fields in the first data structure.

7. The method of claim 6, wherein a portable device executes the method.

8. The method of claim 6 wherein the report includes at least one of biographical information, informational data, a product description, a spreadsheet, a presentation, employee performance tracking data, an invoice, accounts due data, accounts receivable data, projected revenue data, key position data, an organizational chart, an enterprise management report, a headcount, a growth projection, and attrition data.

9. A non-transitory computer-readable medium embodied with program instructions for causing a processor to execute a method for managing meeting presentation material, comprising:
    building a first data structure related to a selected meeting participant and having a plurality of data fields, in response to a selection of a meeting participant;
    generating a query to a data storage for meeting presentation data related to a variety of different enterprise business functions and related to the selected meeting participant;
    in response to the query, populating the data fields with links to meeting presentation data, and receiving and presenting meeting participant-related files from a respective computer application in a graphical user interface representation of the first data structure on a portable device;
    receiving commands to execute data retrieval and further presentation of data;
    generating and presenting a graphical representation of a second data structure having a plurality of data fields populated with links to the files in response to selection of a report from presented reports, wherein the report is one of a customized report, a generic report, and a consolidated report;
    generating and sending another query to the data storage to retrieve the selected reports;
    populating the second data structure with the selected reports;
    receiving commands to execute data retrieval and further presentation of data in the second data structure;
    inserting data in the data fields of the first data structure in response to user inputs to the graphical user interface; and
    linking data in the second data structure to the data fields in the first data structure.

10. The medium of claim 9, wherein the program instructions are stored on a portable device.

11. The medium of claim 9 wherein the report includes at least one of biographical information, informational data, a product description, a spreadsheet, a presentation, employee performance tracking data, an invoice, accounts payable data, accounts receivable data, projected revenue data, key position data, an organizational chart, an enterprise management report, a headcount, a growth projection, and attrition data.

* * * * *